United States Patent [19]

Hojo et al.

[11] Patent Number: 4,653,325
[45] Date of Patent: Mar. 31, 1987

[54] GYRO APPARATUS

[75] Inventors: Takeshi Hojo, Kuroiso; Michio Fukano, Ohtahara; Takashi Saijo; Kazuteru Sato, both of Kuroiso, all of Japan

[73] Assignee: Kabushikikaisha Tokyo Keiki, Japan

[21] Appl. No.: 707,213

[22] Filed: Mar. 1, 1985

[30] Foreign Application Priority Data

Mar. 2, 1984 [JP] Japan .................................. 59-41070
Mar. 2, 1984 [JP] Japan .................................. 59-41071

[51] Int. Cl.$^4$ ........................................... G01P 15/09
[52] U.S. Cl. ...................................... 73/505; 310/329
[58] Field of Search .................. 73/505; 310/321, 329, 310/330, 348, 370

[56] References Cited

U.S. PATENT DOCUMENTS 3,597,642 8/1971 Kurino ............................... 310/321
4,538,461 9/1985 Juptner et al. ......................... 73/505

FOREIGN PATENT DOCUMENTS 84704 8/1983 European Pat. Off. .............. 73/505
1540279 6/1976 United Kingdom ................... 73/505

Primary Examiner—Stephen A. Kreitman
Assistant Examiner—Scott M. Oldham
Attorney, Agent, or Firm—Hill, Van Santen, Steadman & Simpson

[57] ABSTRACT

A gyro apparatus is disclosed which includes a base table, a detecting piezoelectric element attached at its one end to the base table such that its longitudinal direction, is perpendicular to the surface of the base table, a tuning fork having a vibration surface parallel to the surface of the base table and disposed such that its axis is parallel to the surface of the detecting piezoelectric element, and an L-shaped attaching portion attached to a base portion of the tuning fork such that its one leg portion is parallel to said surface of the base table and extended in the direction to vibration mass portions of the tuning fork, wherein the one leg portion is attached with the other end of the detecting piezoelectric element.

8 Claims, 7 Drawing Figures

GYRO APPARATUS

BACKGROUND OF THE INVENTION

1. Field of the Invention

The present invention relates generally to a gyro apparatus and, in particular, is directed to a vibration or tuning fork type gyro apparatus.

2. Description of the Prior Art

As a vibration type gyro apparatus of this kind, there has been so far proposed one such as, shown in FIG. 1. In the prior art gyro apparatus as shown in FIG. 1, a tuning fork 1 is attached to a base table 2 with a flexible shaft 3. A displacement detector 6 and drive coils 4 are provided in association with the tuning fork 1 at a position near the upper end thereof and the output from the displacement detector 6 is supplied through a drive amplifier 5 to the drive coils 4 to thereby maintain the amplitude of the vibration of the tuning fork 1 constant. When an angular velocity $\Omega$ is applied around a (Z—Z) axis of the flexible shaft 3 of the tuning fork 1, there is produced Coriolis force $F_c$ which corresponds to a vibration velocity v of the tuning fork 1 and the input angular velocity $\Omega$, which causes the tuning fork 1 to be alternately rotated around the (Z—Z) axis and, or a twist vibration is generated in the tuning fork 1.

In the prior art example of the gyro apparatus shown in FIG. 1, the twist vibration of the tuning fork 1 is detected by a twist detector 8 and the detected output from the twist detector 8 and the output from the drive amplifier 5 are synchronously rectified by a demodulator 7 to thereby detect the input angular velocity $\Omega$. Thus, a gyro apparatus is constructed.

However, in the prior art vibration type gyro apparatus, since the heavy tuning fork 1 is supported in a cantilever fashion, the load capacity of the flexible shaft 3 must be large. When this support portion must be large, since the above-mentioned prior art vibration type gyro apparatus is formed such that the Coriolis force $F_c$ corresponding to the input angular velocity $\Omega$ is derived as the rotation angle of the tuning fork 1 which has a large moment of inertia, the prior art gyro apparatus has poor sensitivity for the input angular velocity $\Omega$. To increase this sensitivity, the entire apparatus must be made large. Further, since the flexible shaft 3 and the twist detector 8 are respectively formed of different members, the construction of the gyro apparatus is very complicated and the detection sensitivity is quite low.

OBJECTS AND SUMMARY OF THE INVENTION

Accordingly, it is an object of the present invention to provide an improved gyro apparatus.

It is another object of the present invention to provide a gyro apparatus of a simple construction which has high detection sensitivity.

It is a further object of this invention to provide a gyro apparatus which is free of influences exerted by acceleration.

It is a yet further object of this invention to provide a gyro apparatus which prevents errors.

According to one aspect of this invention, there is provided a gyro apparatus comprising:

(a) a base table;

(b) a detecting piezoelectric element attached at one end thereof to said base table such that its longitudinal direction is perpendicular to the surface of said base table;

(c) a tuning fork having a vibration surface parallel to the surface of said base table and disposed such that its axis is parallel to the surface of said detecting piezoelectric element; and (d) an L-shaped attaching portion attached to a base portion of said tuning fork such that its one leg portion is parallel to said surface of said base table and extends in a direction to the vibrating mass portions of said tuning fork, said one leg portion being attached to the other end of said detecting piezoelectric element.

These and other objects, features and advantages of the gyro apparatus according to the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

Now, an embodiment of the gyro apparatus according to the present invention will hereinafter be described with reference to FIGS. 2 and 3. In FIGS. 2 and 3, like parts corresponding to those of FIG. 1 are marked with the same references and will not be described in detail.

FIG. 2 is a perspective view of the embodiment of the gyro apparatus according to this invention and FIG. 3 is a side view of the gyro apparatus of the invention, illustrating the gyro apparatus in the direction shown by an arrow A in FIG. 2. In the embodiment of the present invention shown in FIGS. 2 and 3, a thin plate-shaped piezoelectric element 30 made of a rectangular bimorph leaf for detecting the input angular velocity $\Omega$ is attached to the flat plate-shaped base table 2 so as that it is substantially perpendicular to the upper surface thereof. In this case, an attaching member 30' may be used if required. In the embodiment of the invention, the tuning fork 1 consists of a pair of vibrating mass portions 1-1 and 1-1, each of which have a large mass. Flexible portions 1-2 and 1-2 are coupled to the vibrating mass portions 1-1, 1-1 and to a base portion 1-3 which connects the free ends of both of the flexible portions 1-2 and 1-2. One leg portion 1-4a of an L-shaped attaching portion 1-4 is fixed and extends upwardly substantially perpendicularly to the upper surface of the base portion 1-3 and the other leg portion 1-4b extends substantially parallel to both flexible portions 1-2 and 1-2. A counter weight 1-5 is attached to the lower surface of the base portion 1-3.

The tuning fork 1 thus constructed is fixed to the vibration detecting piezoelectric element 30 of the thin plate shape as follows. The leg portion 1-4b of the L-shaped attaching portion 1-4 is fixed to the upper end of the piezoelectric element 30 such that the width direction B of the thin plate-shaped piezoelectric element 30 extends in a gap g between both flexible portions 1-2 and 1-2 of the tuning fork 1. Thus, the tuning fork 1 is attached to the piezoelectric element 30 such that the vibrating surface of the tuning fork 1 is made to be substantially parallel to the plane of the base table 2 disposed in the horizontal direction, or the vibrating surface is made to be perpendicular to the longitudinal direction of the piezoelectric element 30 as shown in FIG. 2. In this case, the size of the space g between both flexible portions 1-2 and 1-2 is selected to be such that even if the piezoelectric element 30 is vibrated and hence the vibrating surface of the tuning fork 1 is inclined, the piezoelectric element 30 and both flexible portions 1-2 and 1-2 do not make contact with one another. Furthermore, the height of the piezoelectric element 30 on the base table 2 is selected to be such that the vibrating mass portions 1-1 and 1-1 of the tuning fork 1, the counter weight 1-5 are not in contact with the upper surface of the base table 2.

Figure 1:
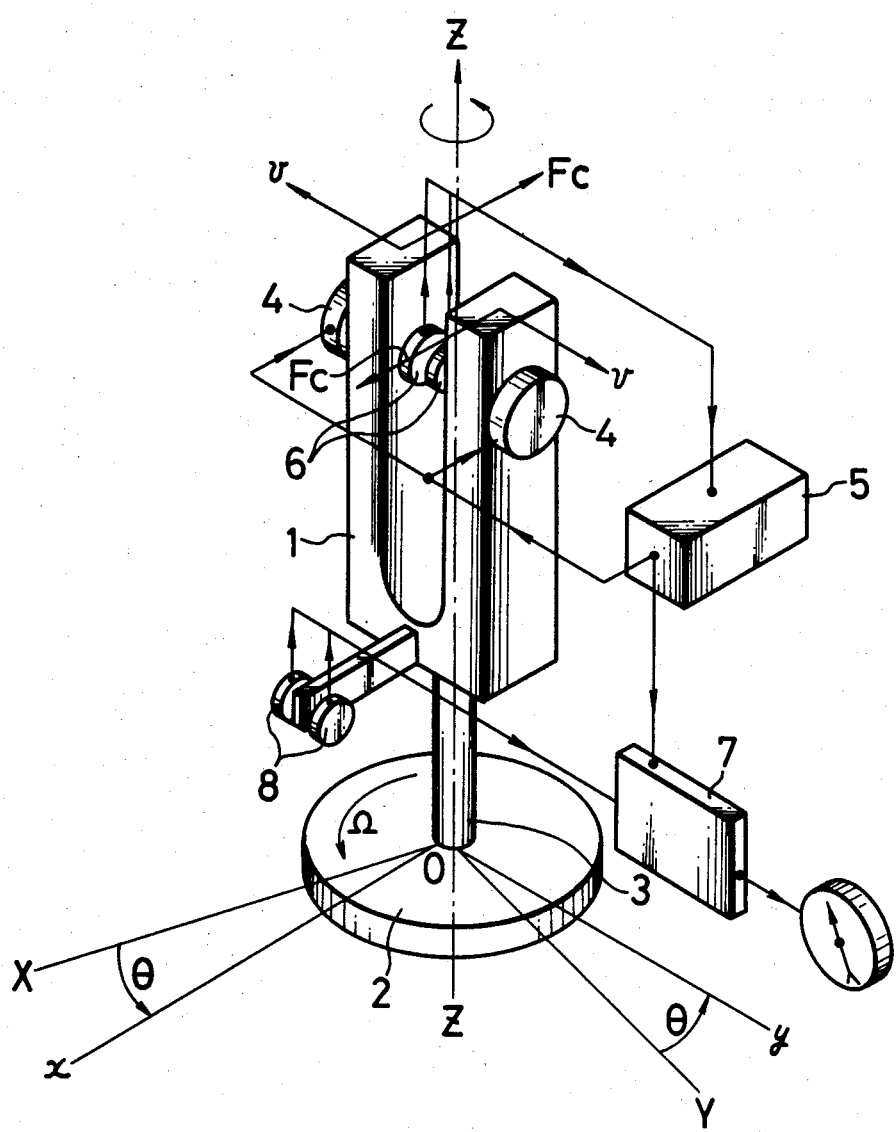
FIG. 1 is a perspective view illustrating an example of a prior art gyro apparatus.
Figure 2:
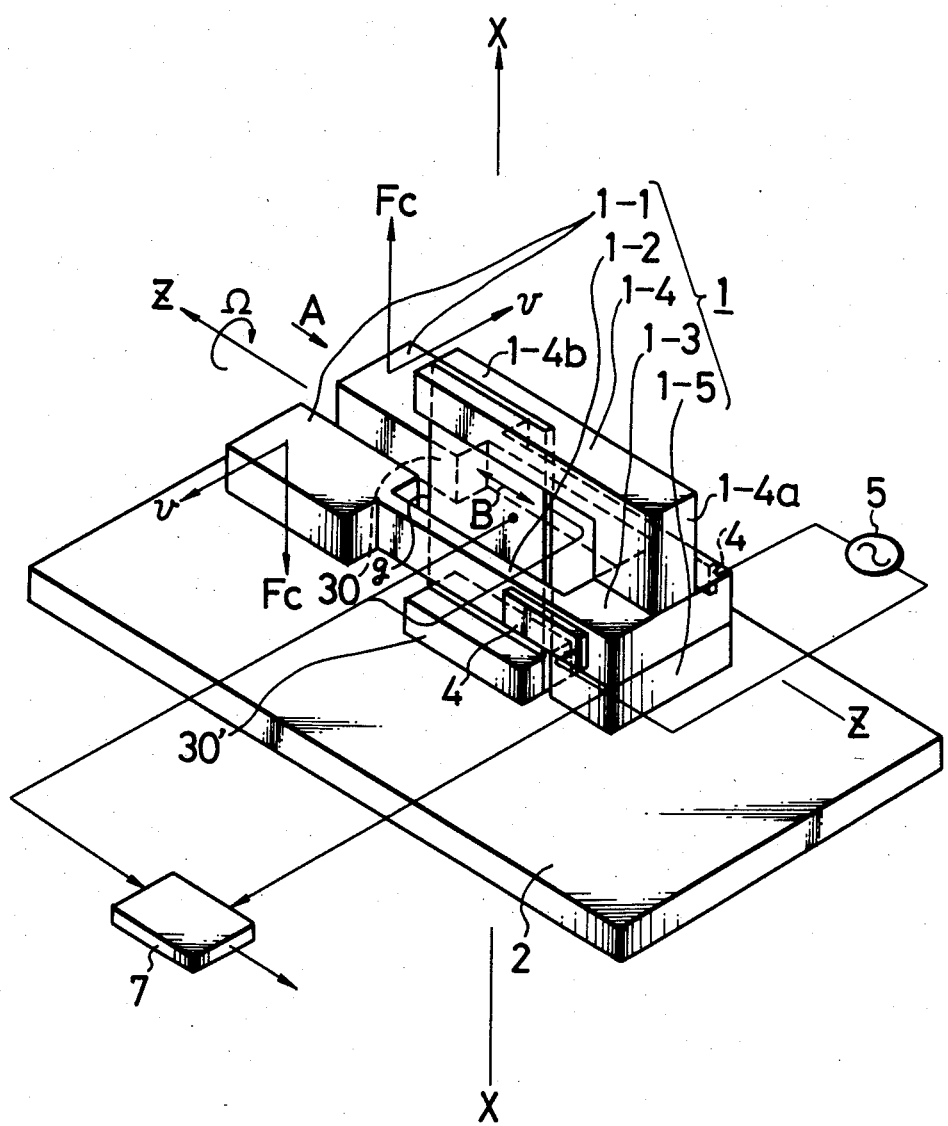
FIG. 2 is a perspective view illustrating a first embodiment of the gyro apparatus according to this invention.
Figure 3:
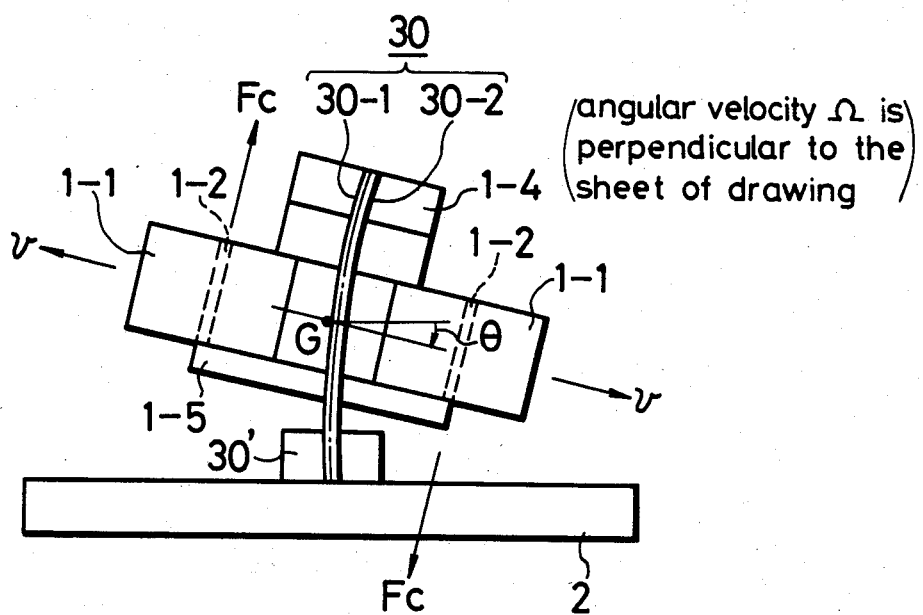
FIG. 3 is a side view of FIG. 2, illustrating a state in which an angular velocity is applied to the gyro apparatus.

In FIG. 2, reference numerals 4 and 4 designate, for example, drive piezoelectric elements which are attached to both flexible portions 1-2 and 1-2 and correspond to the drive coils 4 in FIG. 1. These drive piezoelectric elements 4 and 4 are driven by the signal from, for example, an AC signal source 5 which corresponds to the drive amplifier 5 in FIG. 1 to generate an alternating vibration in the vibration mass portions 1-1 and 1-1 of the tuning fork 1 which has a velocity V.

In this case, the signal from the AC signal source 5 and, the output voltage from the detecting piezoelectric element 30 are supplied to the demodulator 7 and the AC signal serves as the reference voltage. In the demodulator 7 the signal is synchronously rectified so that the demodulator 7 produces a voltage proportional to the input angular velocity $\Omega$ around the (Z—Z) axis.

As shown in FIG. 3, in the first embodiment of the invention constructed as mentioned above, the center of gravity G of the entire tuning fork 1, the L-shaped attaching portion 1-4 and the counter weight 1-5 are designed so as to be placed at a position which is substantially ½ of the length in the longitudinal direction (the up and down direction in the figure) of the detecting piezoelectric element 30. If, the angular velocity $\Omega$ acts on the vibrating mass portions 1-1 and 1-1 of the tuning fork 1 which is vibrating at a speed v and then Coriolis force $F_c$ is generated, a couple acts on the tuning fork 1 and the vibrating surface of the tuning fork 1 is inclined from the preceding state (horizontal state) by the displacement angle shown as $\theta$ and the tuning fork 1 is balanced by the spring tension of the detecting piezoelectric element 30. Since the detecting piezoelectric element 30 is a so-called bimorph leaf formed by bonding two thin plate-shaped piezoelectric elements 30-1 and 30-1 as shown in FIG. 3, when it is deformed as shown in the figure, a contraction stress is produced in one piezoelectric element 30-2 while a tension stress is produced in the other piezoelectric element 30-1 so that a voltage corresponding to the amount of deformation is produced across electrodes (not shown) provided in the piezoelectric elements 30-1 and 30-2. In other words, if the vibration amplitude and the vibrating frequency of the vibrating mass portions 1-1 and 1-1 of the tuning fork 1 are constant, the described voltage produced between the piezoelectric elements 30-1 and 30-2 will be proportional to the input angular velocity $\Omega$, and thus a gyro effect results.

Figure 4:
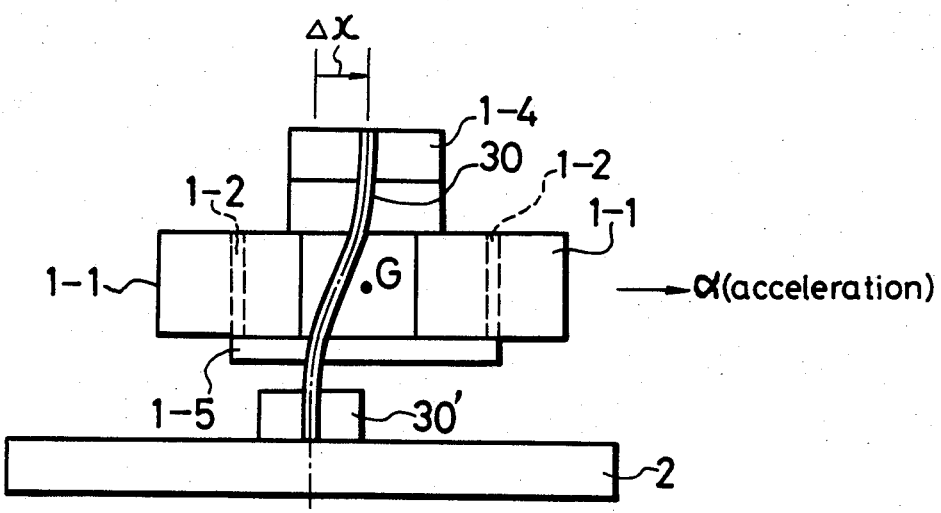
FIG. 4 is a side view of FIG. 2, illustrating a state in which an acceleration is applied to the gyro apparatus.

FIG. 4 shows the deformed state of the detecting piezoelectric element 30 when an external acceleration $\alpha$ in parallel to the vibration surface of the tuning fork 1 acts on the tuning fork 1 and the vibrating mass portions 1-1 and 1-1 are vibrated at the vibration speed v. As earlier noted, since the center of gravity G of the tuning fork 1 and the other elements are placed substantially at the center of the longitudinal axis of the detecting piezoelectric element 30, while the tuning fork 1 is maintained in the horizontal direction, the piezoelectric element 30 will be displaced in the lateral (horizontal) direction by $\Delta X$ and will be balanced with the acceleration $\alpha$.

More particularly, the detecting piezoelectric element 30 becomes curved into an S-shape as shown in FIG. 4, so that the curvature is reversed between the upper half and lower half and hence no voltage is produced between the electrodes. In other words, even if the acceleration caused by the vibration in the direction parallel to the vibration surface of the tuning fork 1, namely, in the horizontal direction is applied to the tuning fork 1, the detection of the input angular velocity $\Omega$ is not affected.

It is to be noted that a horizontal acceleration causes the vibrating mass portions 1-1 and 1-1 to move horizontally and that the top (relative to FIG. 4) of a piezoelectric element 30 also moves horizontally and the signal picked up by piezoelectric element 30 will match the acceleration.

As described above, the present invention comprises a gyro apparatus of simple construction in which the L-shaped attaching portion 1-4 having the leg portion 1-4b extending in the direction to the vibrating mass portions 1-1 and 1-1 of the tuning fork 1 is attached to the base portion 1-3 of the tuning fork 1, and the detecting piezoelectric element 30 is attached perpendicularly to the base table 2 and passes substantially through the position of the center of gravity G of the tuning fork 1 and through the central gap g of the tuning fork 1 and the other end is connected to the leg portion 1-4b of the L-shaped attaching portion 1-4.

The first embodiment of the gyro apparatus of the invention shown in FIG. 2 will be compared with the example of the prior art gyro apparatus shown in FIG. 1. Since the functions of the flexible shaft 3 and the twist detector 8 of the gyro apparatus of the prior art example can be realized by one detecting piezoelectric element 30 in this invention and in this invention the tuning fork 1 are supported at the center of gravity in the direction (of the axis coincident with the (Z—Z) input axis), unlike the prior art example in which the tuning fork 1 are supported in a cantilever fashion, and in the invention the entire gyro apparatus can be made small, and the strength of the detecting piezoelectric element 30 can be less than the prior art and the detecting sensitivity can be increased.

Further, according to this embodiment of the invention, since the counter weight portion 1-5 is provided on the base portion 1-3, to which the L-shaped attaching portion 1-4 of the tuning fork 1 is fixed and, at the opposite side of the L-shaped attaching portion 1-4 so as to locate the center of gravity G of the tuning fork 1 at the center of the vibrating mass portions 1-1 and 1-1 of the tuning fork 1 and also to locate the center of the gravity G in coincidence with the center of the longitudinal axis of the piezoelectric element 30, it is possible to remove the influence exerted by the acceleration caused by the vibration in the horizontal direction.

Furthermore, according to the present invention, since the vibrating mass portions 1-1 and 1-1 of the tuning fork 1 in which the Coriolis force $F_c$ appears are formed to be rectangular in shape and to have large masses, the flexible portions 1-2 and 1-2 extend a long distance in the axis direction of the tuning fork 1 and they also are formed as a thin plate in the vibrating direction, and vibrating mass portions 1-1 and 1-1 can be vibrated with a large amplitude and hence it is possible to make the detecting sensitivity high.

In the present invention, the L-shaped attaching portion 1-4 and the counter weight portion 1-5 are formed of different members separate from the tuning fork 1, and the tuning fork 1 can be easily formed from a flat plate with high precision and with low cost by a manufacturing method such as wire-cutting.

While in the above-described first embodiment of the present invention, the bimorph leaf formed by bonding two thin plate-shaped piezoelectric elements is used as the detecting piezoelectric element 30, depending on the requirements of the strength in designing the gyro apparatus, it is possible to use as the detecting piezoelectric element 30 a bimorph leaf in which a thin plate made of a material having large strength such as metal is sandwiched between two thin plate-shaped piezoelectric elements.

In addition, when the free vibration frequency with respect to the angular displacement around the (Z—Z) axis determined by the moment of inertia around the (Z—Z) input axis of the tuning fork 1 and the bending spring constant of the detecting piezoelectric element 30 can be made to be substantially coincident with the resonance frequency of the tuning fork 1, and it is possible to increase the detecting sensitivity.

Figure 5:
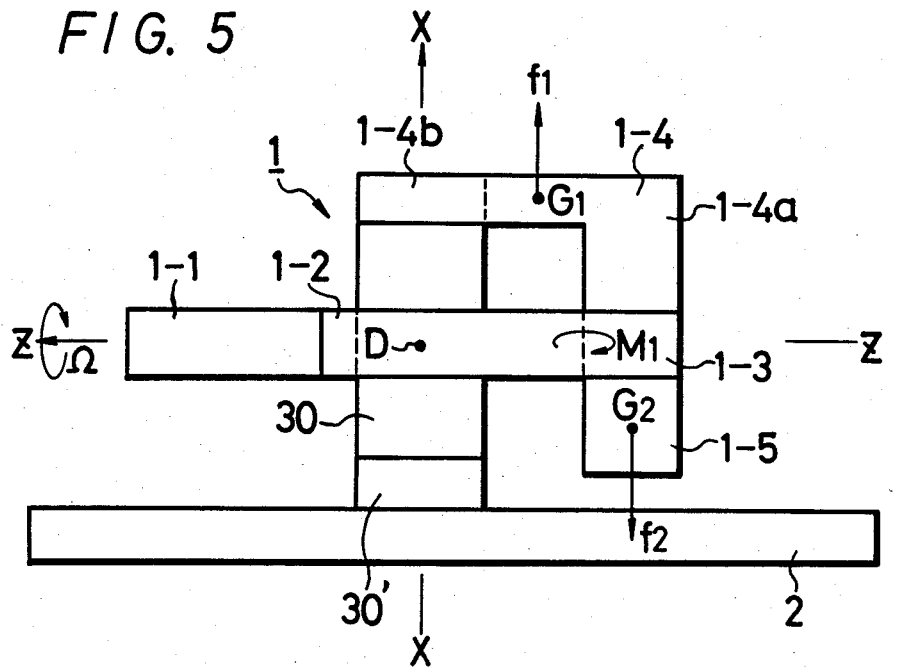
FIG. 5 is a side view useful for explaining the gyro apparatus of FIG. 2 more fully.

However, in the gyro apparatus shown in FIG. 2, the counter weight portion 1-5 is formed as a block shape as shown in FIG. 5 so that it is very difficult to correctly balance the center of gravity G2 of the counter weight portion 1-5 with the center of gravity G1 of the L-shaped attaching portion 1-4 with respect to the crossing point D between the (X—X) axis and (Z—Z) axis.

Since the center of gravity G1 of the L-shaped attaching portion 1-4 and the center of gravity G2 of the counter weight portion 1-5 are spaced apart with respect to the (Z—Z) axis direction, if the angular velocity $\Omega$ acts around the (Z—Z) axis, a moment M1 will be produced by centrifugal forces f1 and f2 acting on the centers of gravity G1 and G2 around an axis which passes through the crossing point D and is perpendicular to both (X—X) axis and (Z—Z) axis. This moment M1 weakens the connection between the piezoelectric element 30 and the leg portion 1-4b and a bending force is produced in the piezoelectric element 30 around the axis passing through the crossing point D which is perpendicular to the (X—X) axis and the (Z—Z) axis.

Figure 6:
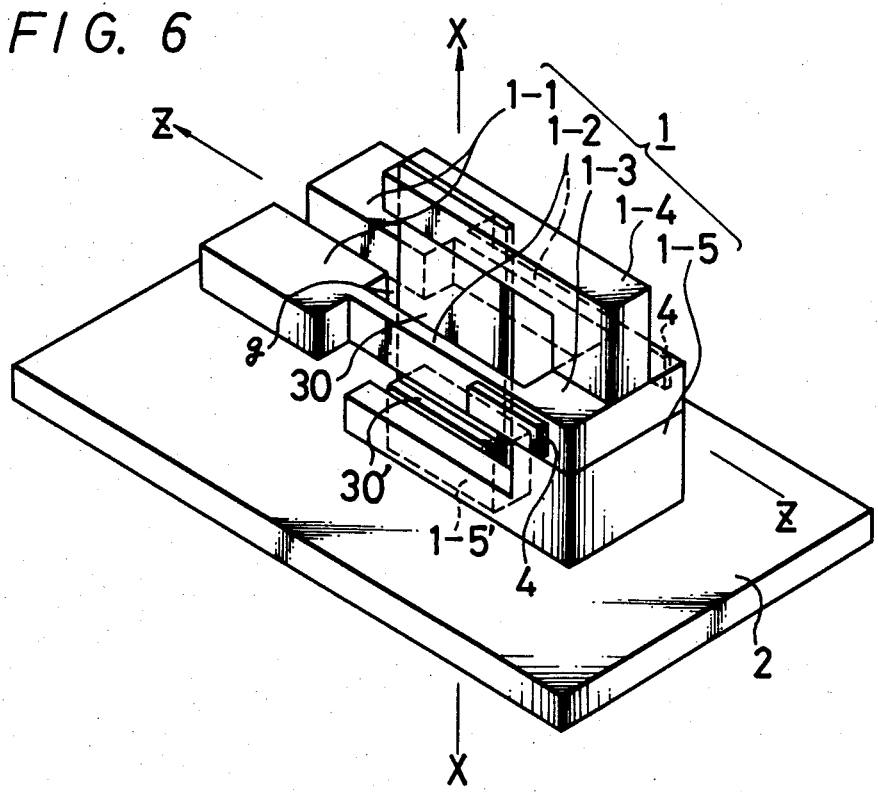
FIG. 6 is a perspective view illustrating a second embodiment of the gyro apparatus according to the present invention.

A second embodiment of the gyro apparatus according to the present invention in which the afore-noted defects are removed will be described with reference to FIG. 6. FIG. 6 is a perspective view illustrating the second embodiment of such gyro apparatus. In FIG. 6, like parts corresponding to those of FIGS. 2 and 5 are marked with the same references and will not be described in detail.

A difference between the second embodiment shown in FIG. 6 and the first embodiment shown in FIG. 2 lies in the following points. In the second embodiment of the present invention as shown in FIG. 6, two leg portions 1-5' extend parallel to each other in a direction perpendicular to the vibrating direction of the vibration mass portions 1-1 and 1-1 of the tuning fork 1 and along the (Z—Z) axis direction and are attached to the counter weight portion 1-5 so as to sandwich the attaching portion 30' therebetween (the other leg portion 1-5' is positioned symmetrically to the leg portion 1-5' which is shown with respect to the detecting piezoelectric element 30 and the other leg portion is not shown in FIG. 6), and the counter weight portion 1-5 is formed like a fork. Thus, the center of gravity G2 thereof is moved in a direction relative to the vibrating mass portion 1-1 in the down direction whereby the center of gravity G1 of the L-shaped attaching portion 1-4 and the center of gravity G2 of the counter weight portion 1-5 become perfectly symmetrical with each other around the (Z—Z) axis and the (X—X) axis. The gyro apparatus of the first and second embodiments are substantially similar in other respects.

In other words, the additional legs 1-5' in FIG. 6 cause the center of gravity $G_2$ to move so that it coincides with $G_1$ and this compensates for bending about the perpendicular axis to Z—Z and X—X.

To avoid errors caused by changes of temperature, the tuning fork 1, the L-shaped attaching portion 1-4 are made of a constant modulus alloy having a zero thermoelastic coefficient (TEC).

In the second embodiment of the present invention shown in FIG. 6, since the center of gravity G1 of the L-shaped attaching portion 1-4 and the center of gravity G2 of the counter weight portion 1-5 are made perfectly symmetrical with respect to both the (Z—Z) axis and the (X—X) axis, even if the input angular velocity $\Omega$ acts around the (Z—Z) axis and the centrifugal forces f1 and f2 act on the center of gravity G1 and the center of gravity G2, a moment M1 will not be produced which differs from the gyro apparatus of FIG. 2. Accordingly, the gyro apparatus of the second embodiment shown in FIG. 6 is free of the shortcomings inherent in the gyro apparatus of FIG. 2 and will have a long life and no errors.

Figure 7:
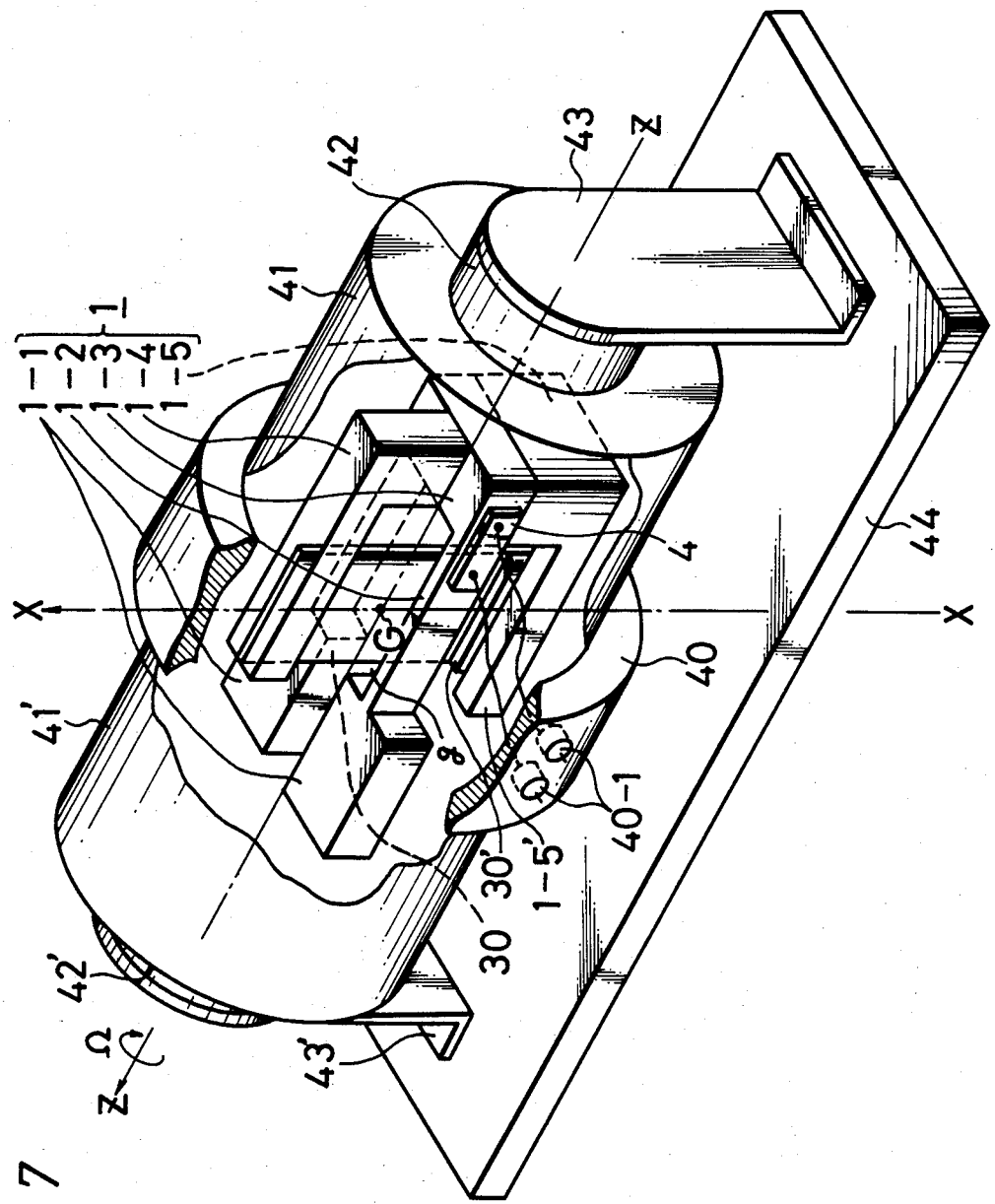
FIG. 7 is a partially cutout perspective view illustrating a third embodiment of the gyro apparatus according to the present invention.

FIG. 7 is a partially cut-out perspective view illustrating a third embodiment of gyro apparatus according to the present invention. In FIG. 7, like parts corresponding to those of FIGS. 2 and 6 are marked with the same references and will not be described in detail.

In the third embodiment of this invention shown in FIG. 7, from both sides of the counter weight portion 1-5 extend two leg portions 1-5' each of which is parallel to the (Z—Z) axis and they extend in the direction of the vibrating mass portion 1-1 and grip within a gap the attaching portion 30'. Also, the center of gravity G of a vibrating system consisting of the tuning fork 1, and the piezoelectric element 30 is made to be substantially coincident with the crossing point of the (Z—Z) axis and the (X—X) axis similar to the second embodiment of the invention shown in FIG. 6.

In the third embodiment, as shown in FIG. 7, the lower end portion of the detecting piezoelectric element 30 supports the tuning fork 1 similarly to FIGS. 2 and 6 and is fixed to the inside of a support ring 40 along its ring axis which coincides with the (Z—Z) axis. Opening portions of cylindrical members 41 and 41' having the same shape and the same size and with one end closed are respectively fixed to both opening ends of the support ring 40 in an air-tight manner and the tuning fork 1 including the piezoelectric element 30 is mounted therein in an air-tight manner. In this case, the axis of the support ring 40 and the cylindrical members 41 and 41' is made coincident with the (Z—Z) axis. The closed ends of the cylindrical members 41 and 41' are respectively fixed by columnar resilient members 42 and 42' to upper ends of two L-shaped metal fitting members 43 and 43' which have their lower ends are respectively fixed to an attaching base table 44 and thus the support ring 40 is fixed to the attaching base table 44. Reference numeral 40-1 designates terminals attached to the support ring 40 by a hermetic seal method. Through the terminals 40-1, the piezoelectric element 30 is held in an air-tight manner within the support ring 40 and to the AC signal source 5 and the demodulator 7.

In the gyro apparatus constructed as described above, each support member is designed such that the center of gravity of the support portion consisting of the support ring 40 and the cylindrical members 41 and 41' containing the weight of the attaching portion 30' of the detecting piezoelectric element 30 is made to be coincident with the center of gravity G of the tuning fork 1.

To avoid errors due to changes of temperature, the tuning fork 1 and the L-shaped attaching portion 1-4 are made of a constant modulus alloy having a zero thermoelastic coefficient (TEC).

The frequency $f_F$ of the tuning fork 1 and the resonant frequency $f_0$ around the (Z—Z) axis is determined by the tuning fork system around the (Z—Z) axis and the torque spring constant of the detecting piezoelectric element 30 which must be made to be substantially equal to each other so as to increase the output sensitivity of the gyro apparatus.

In this third embodiment of the present invention, if the moment of inertia of the support portion consisting of the attaching portion 30', the support ring 40 and the cylindrical members 41 and 41' around the (Z—Z) axis is taken as $I_S$, the moment of inertia of the tuning fork system around the (Z—Z) axis is taken as $I_F$ and the torque spring constant of the detecting piezoelectric element 30 around the (Z—Z) axis is taken as K, the resonant frequency $f_0$ around the (Z—Z) axis is expressed as $$f_0 = \frac{1}{2\pi} \sqrt{\frac{I_S + I_F}{I_S \cdot I_F} \cdot K}$$

Thus, the resonant vibration condition of the third embodiment is expressed as $$f_F \approx f_0 = \frac{1}{2\pi} \sqrt{\frac{I_S + I_F}{I_S \cdot I_F} \cdot K}$$

The gyro apparatus according to the third embodiment of the present invention has the following advantages:

Since the center of gravity of the support portion consisting of the support ring 40 and the cylindrical members 41 and 41' and the center of gravity of the tuning fork 1 are made to be coincident with each other and the support portions are supported symmetrically with respect to the center of gravity by the resilient members 42 and 42' and the L-shaped metal fitting members 43 and 43', it is possible to obtain a gyro apparatus which is free influences caused by the vibration and the rigidity of the attaching portion of the subject whose angular velocity is to be measured.

Since the members within the support portions are symmetrically supported with respect to the center of gravity, the gyro apparatus of the invention can be protected from the influence of the acceleration.

Since the frequency $f_F$ of the tuning fork 1 and the resonant frequency around the (Z—Z) axis are defined by $$f_0 = \frac{1}{2\pi} \sqrt{\frac{I_S + I_F}{I_S \cdot I_F} \cdot K}$$

where $I_F$ and $I_S$, are respectively, the moments of inertia of the tuning fork 1 and the support portion around the (Z—Z) axis and K is the torque spring constant of the detecting piezoelectric element 30 with respect to the input axis which are selected to be substantially the same value, the gyro apparatus of this invention can produce optimum detecting sensitivity and results in an improved gyro apparatus, or an angular velocity detecting apparatus. The resonant frequency $f_F$ is made equal to the resonant frequency of about the Z—Z axis.

Since the portions within the support ring 40 are held in an air tight manner, it is possible to prevent errors from being caused when an external disturbance such as wind or sound act on the vibration system of the gyro apparatus.

The above description is given for the preferred embodiments of the invention, but it will be apparent that many modifications and variations could be effected by one skilled in the art without departing from the spirit or scope of the novel concepts of the invention, so that the scope of the invention should be determined only by the appended claims.

We claim as our invention:

1. A gyro apparatus comprising:
  (a) a base table;
  (b) a detecting piezoelectric element attached at one end thereof to said base table such that its longitudinal direction is perpendicular to the surface of said base table;
  (c) a tuning fork having a vibration surface parallel to the surface of said base table and disposed such that its axis is parallel to the surface of said detecting piezoelectric element; and
  (d) an L-shaped attaching portion attached to a base portion of said tuning fork such that its one leg portion is parallel to said surface of said base table and extended in the direction to vibration mass portions of said tuning fork, said one leg portion being attached with the other end of said detecting piezoelectric element, and further comprising a counter weight portion which is provided on said base portion of said tuning fork at its side opposite to the side to which said L-shaped attaching portion is attached, whereby the center of gravity of said tuning fork in the longitudinal direction of said detecting piezoelectric element is made coincident with the center of the thickness of said tuning fork.

2. A gyro apparatus as claimed in claim 1, in which the center of gravity of said tuning fork is positioned at substantially the center of said detecting piezoelectric element in its longitudinal direction.

3. A gyro apparatus as claimed in claim 1, in which an angular resonant frequency determined by a moment of inertia of said tuning fork or the like around its input axis and a bending spring constant of said detecting piezoelectric element is made substantially equal to a resonance frequency of said tuning fork.

4. A gyro apparatus as claimed in claim 1, in which said tuning fork is formed of two rectangular vibration mass portions each having a large mass and two flexible portions each of which is thin in the vibration direction and long in the input axis direction and two drive piezoelectric elements are attached to portions where said flexible portions are connected to said base portion respectively.

5. A gyro apparatus as claimed in claim 1, in which said counter weight portion includes two leg portions which are extended in parallel to an axis of said tuning fork and the direction to said vibration mass portions of said tuning fork along the both sides of said detecting piezoelectric element, whereby the center of gravity of said L-shaped attaching portion and the center of gravity of said counter weight portion are passed through the center of said axis of tuning fork and said detecting piezoelectric element so as to become symmetrical with respect to an axis perpendicular to said axis of tuning fork.

6. A gyro apparatus as claimed in claim 5, in which the center of gravity of said base table is made substantially coincident with that of said tuning fork and said base table is symmetrically supported by resilient members around the center of gravity of said tuning fork.

7. A gyro apparatus as claimed in claim 6, in which said base table is formed of a support ring whose center axis is coincident with the axis of said tuning fork, and two cylindrical members whose open ends are attached to both openings of said support ring and whose center axis is coincident with that of said support ring.

8. A gyro apparatus as claimed in claim 6, in which a resonant frequency $f_0$ expressed by the following equation is made substantially equal to the vibration frequency of said tuning fork $$f_0 = \frac{1}{2\pi} \sqrt{\frac{I_S + I_F}{I_S \cdot I_F} \cdot K}$$

where $I_F$ is the moment of inertia of said tuning fork around its axis, $I_S$ is the moment of inertia of said base table and K is the torque spring constant of said detecting piezoelectric element around the axis of said tuning fork.

* * * * *